US006734227B2

(12) United States Patent
Jing et al.

(10) Patent No.: US 6,734,227 B2
(45) Date of Patent: May 11, 2004

(54) OPTICAL ELEMENTS COMPRISING A FLUOROPOLYMER SURFACE TREATMENT

(75) Inventors: Naiyong Jing, Woodbury, MN (US); George Van Dyke Tiers, St. Paul, MN (US); Mark J. Pellerite, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 338 days.

(21) Appl. No.: 09/961,669

(22) Filed: Sep. 24, 2001

(65) Prior Publication Data

US 2003/0091794 A1 May 15, 2003

(51) Int. Cl.[7] .............................. C08K 9/04; F21V 7/22; B32B 27/06; G03B 21/58
(52) U.S. Cl. ...................... 523/210; 523/172; 523/205; 524/805; 526/247; 428/407; 428/421; 359/453
(58) Field of Search ................ 523/172, 205, 523/210; 524/805; 526/247; 428/407, 421; 359/453

(56) References Cited

U.S. PATENT DOCUMENTS

| 2,567,011 | A | | 9/1951 | Diesslin et al. |
| 2,606,206 | A | | 8/1952 | Guenthner |
| 2,642,416 | A | | 6/1953 | Ahlbrecht et al. |
| 2,662,835 | A | | 12/1953 | Reid |
| 2,666,797 | A | | 1/1954 | Husted et al. |
| 2,693,458 | A | | 11/1954 | Olson |
| 2,706,733 | A | | 4/1955 | Reid |
| 2,727,923 | A | | 12/1955 | Husted |
| 2,732,398 | A | | 1/1956 | Brice et al. |
| 2,759,019 | A | | 8/1956 | Brown et al. |
| 2,764,602 | A | | 9/1956 | Ahlbrecht |
| 2,803,615 | A | | 8/1957 | Ahlbrecht |
| 2,803,656 | A | | 8/1957 | Ahlbrecht |
| 2,809,990 | A | | 10/1957 | Brown |
| 2,841,573 | A | | 7/1958 | Ahlbrecht |
| 2,934,450 | A | | 4/1960 | Brown |
| 3,222,204 | A | | 12/1965 | Tomlinson |
| 5,128,203 | A | | 7/1992 | LaRoche |
| 5,919,878 | A | * | 7/1999 | Brothers et al. ............ 526/247 |
| 6,153,671 | A | | 11/2000 | Schleifstein |
| 2003/0157336 | A1 | * | 8/2003 | Kinoshita et al. ............ 428/421 |

* cited by examiner

Primary Examiner—Tae H. Yoon
(74) Attorney, Agent, or Firm—Carolyn A. Fischer

(57) ABSTRACT

The present invention relates to optical elements comprising fluorochemical surface treatments. The invention further relates to articles such as retroreflective sheetings, pavement markings and beaded projection screens comprising a binder and the surface treated optical elements. The surface treatment comprises at least one fluoropolymer selected from a) fluoropolymers comprising a fluorinated hydrocarbon backbone and side chains comprising at least one of fluoroalkyl, fluoroether alkyl, fluoroalkoxy and mixtures thereof; and b) fluoropolymers comprising a hydrocarbon backbone and side chains comprising at least one of fluoroether alkyl, fluoroalkoxy and mixtures thereof.

28 Claims, No Drawings

OPTICAL ELEMENTS COMPRISING A FLUOROPOLYMER SURFACE TREATMENT

FIELD OF THE INVENTION

The present invention relates to optical elements comprising fluorochemical surface treatments. The invention further relates to articles such as retroreflective sheetings, pavement markings and beaded projection screens comprising a binder and the surface treated optical elements. The surface treatment comprises at least one fluoropolymer selected from a) fluoropolymers comprising a fluorinated hydrocarbon backbone and side chains comprising at least one of fluoroalkyl, fluoroether alkyl, fluoroalkoxy and mixtures thereof; and b) fluoropolymers comprising a hydrocarbon backbone and side chains comprising at least one of fluoroether alkyl, fluoroalkoxy and mixtures thereof.

BACKGROUND OF THE INVENTION

Beaded projection display screens, retroreflective sheeting used in the manufacture of roadway signs, and retroreflective paints typically include optical elements adhered through the use of a binder. In the case of beaded projection display materials, the optical elements are microscopic glass beads that act as lenses to collect projected light from the rear of the screen and focus it to relatively small spots, near the surfaces of the microspheres. The foci are approximately in the areas where the optical elements contact a front support layer. In other retroreflective materials, the optical elements act as lenses which focus the light onto a reflector (metal mirror of diffusely reflecting pigment) and once the light has been reflected off the reflector the microspheres again act as lenses to resend the light back toward the incoming light source. In order to contribute the desired retroreflective property, however, it is important that a layer of glass microspheres be present on the surface of the binder layer.

As discussed in U.S. Pat. No. 3,222,204, ordinary glass beads tend to sink into the uncured liquid binder layer. In instances wherein the individual beads are not entirely submerged, the optical properties of the bead can also be impaired by the binder wetting out the bead surface and spreading on the exposed bead surface. To address this problem, U.S. Pat. No. 3,222,204 teaches coating the glass beads with a thin surface coating of an oleophobic fluorocarbon-sizing agent. At column 5, lines 61–75, this reference states that, "Aqueous treating solutions of fluorocarbon chromium coordination complexes are preferred and are described in U.S. Pat. Nos. 2,662,835 (Dec. 15, 1953) and 2,809,990 (Oct. 15, 1957) and 2,934,450 (Apr. 26, 1960). The complex may be made by reacting chromyl chloride with a fluorocarbon monocarboxylic acid (having a highly fluorinated terminal chain or tail containing 4 to 10 carbon atoms) in an isopropanol vehicle that serves as both a solvent and reducing agent, the chromium to acid mole ratio being in the range of 2:1 to 5:1. The resultant green-colored isopropanol solution of the complex is diluted with water at the time of use. The fluorocarbon acid preferably has 6 to 8 fully fluorinated (perfluorinated) carbon atoms in the terminal fluorocarbon chain or tail." Specific working examples include chromium coordination complexes of perfluorooctanoic acid and N-ethyl-N-perfluorooctanesulfonyl glycine.

U.S. Pat. No. 4,713,295 teaches coating glass beads with a mixture of substances. The mixture comprises a first substance, which if used alone would tend to make the beads hydrophobic while leaving them oleophilic, and a second substance, which if used alone would tend to make the beads both hydrophobic and oleophobic. "For the best results, it is preferred to use a second substance which is an anionic fluorocarbon compound, and optimally, said second substance is a fluoro-alkyl-sulphonate, for example a fluoro-alkyl-sulphonate in which the alkyl has a long chain (C14 to C18)." (See Column 4, lines 8–13). The exemplified hydrophobic and oleophobic substance is a potassium fluoroalkyl-sulphonate (for example FC129 from 3M). (See column 5, lines 50–52) FC129 is a potassium fluorooctyl sulphonyl-containing compound.

SUMMARY OF THE INVENTION

The present invention relates to optical elements having a surface treatment comprising at least one fluoropolymer selected from:

a) fluoropolymers comprising a fluorinated hydrocarbon backbone and side chains comprising at least one of fluoroalkyl, fluoroether alkyl, fluoroalkoxy and mixtures thereof; and b) fluoropolymers comprising a hydrocarbon backbone and side chains comprising at least one of fluoroether alkyl, fluoroalkoxy and mixtures thereof.

The backbone of the fluoropolymer surface treatment is preferably free of oxygen atoms. The fluoropolymer is preferably perfluorinated. The surface treatment is substantially free of perfluoroalkyl side chains or end groups having 6 or more carbon atoms, and more preferably substantially free of perfluoroalkyl side chains or end groups having more than 4 carbon atoms.

In one aspect, the fluoropolymer is prepared from at least one fluorovinyl ether monomer and at least one comonomer having a polymerizable double bond. The fluorovinyl ether monomer is preferably selected from $CF_2=CF-O-CF_3$ (PMVE), $CF_2=CF-O-CF_2CF_2CF_3$ (PPVE), $CF_2=CF-O-CF_2CF(CF_3)-O-CF_2CF_2CF_3$ (PPVE-2) and mixtures thereof. For embodiments wherein PMVE is the sole fluorovinyl ether monomer, the fluoropolymer preferably comprises at least about 30 mole % of repeat units derived from PMVE. It is surmised, however, that lower concentrations of repeat units derived from PMVE would also be suitable provided that the fluoropolymer has a molecular weight of less than about 30,000 g/mole. For embodiments wherein PPVE is the sole fluorovinyl ether monomer, the fluoropolymer preferably comprises from about 10 to about 20 mole % of repeat units derived from PPVE. For embodiments wherein PPVE-2 is the sole fluorovinyl ether monomer, the fluoropolymer preferably comprises from about 1 to about 10 mole % of repeat units derived from PPVE-2. The comonomer is preferably tetrafluoroethylene (TFE) employed alone or in combination with vinylidene fluoride (VDF). The fluoropolymer preferably comprises about 10 to about 30 mole % of repeat units derived from TFE and about 50 to about 80 mole % of repeat units derived from VDF. Other suitable comonomers include alkyl (meth)acrylates, substituted alkyl (meth)acrylates, (meth)acrylic acid, (meth)acrylamides, alkenes, styrenes, vinyl halides, vinyl esters, and mixtures thereof.

In another aspect, the fluoropolymer is a homopolymer or copolymer prepared from at least one monomer selected from fluoroalkyl ether acrylate, fluoroalkoxy acrylate, and mixtures thereof. The copolymer further comprises repeat unit derived from at least one of alkyl (meth)acrylates, substituted alkyl (meth)acrylates, (meth)acrylic acid, (meth) acrylamides, fluorinated alkenes, styrenes, vinyl halides, malaic anhydride, vinyl esters, and mixtures thereof The surface treatment may further comprise a second polymer blended therewith. The percent float in heptane of the surface treated optical elements is preferably at least about 90%. The fluoropolymer surface treatment is preferably present at an amount of less than about 300 ppm and more preferably at an amount of about 50 ppm or less.

In another aspect, the invention provides a method of coating optical elements comprising the steps of:

a) providing at least one surface treatment comprising:
  i) fluoropolymers comprising a fluorinated hydrocarbon backbone and side chains comprising at least one of fluoroalkyl, fluoroether alkyl, fluoroalkoxy and mixtures thereof, and/or
  ii) fluoropolymers comprising a hydrocarbon backbone and side chains comprising at least one of fluoroether alkyl, fluoroalkoxy and mixtures thereof;
b) coating optical elements with said composition; and
c) drying said composition.

The surface treatment is preferably an aqueous composition, yet may optionally comprise up to about 30 wt-% of a cosolvent, with respect to the total weight of the surface treatment solution.

In another aspect, the present invention relates to a pavement marking article comprising a liquid binder and a multitude of the surface treated optical elements.

In another aspect, the present invention relates to reflective sheeting articles comprising:

a) a top coat layer having an exposed surface;
b) a binder layer disposed on the exposed surface of the top coat layer;
c) a multitude of the surface treated optical elements disposed in the binder layer;
d) a space coat layer disposed on the binder layer; and
e) a reflective layer disposed on the space coat layer.

In another aspect, the present invention relates to a rear projection screen article comprising a transparent substrate and the surface treated optical elements embedded in an opaque binder matrix and wherein said optical elements are in contact with the transparent substrate.

In each of the articles, the optical elements are preferably embedded in the binder at a depth of about 40–70% of their diameters.

DETAILED DESCRIPTION OF THE INVENTION

The present invention relates to optical elements such as glass beads coated with a fluorocarbon surface treatment. The terminology "optical element(s)" refers to a material having a particle size ranging from about 25 to 1000 microns and having a refractive index ranging from about 1.5 to about 2.3 and higher.

The optical elements have at least one dimension that is no larger than 2 millimeters and preferably no larger than 250 microns. The optical elements may be in the form of any shape such as granules, flakes and fibers. However, spheroidal glass elements, denoted as "glass beads", "beads" and "microspheres" hereinafter are preferred for materials such as retroreflective articles (e.g. retroreflective sheetings, pavement markings and beaded projection screens).

During the manufacture of retroreflective materials, optical elements are fixed in place by means of a liquid binder. Optical elements have a density or specific gravity several times that of the liquid binder, causing the optical elements to sink into the liquid binder layer, rather than float on the surface.

Preferred properties of optical elements will be described herein with respect to glass beads. Ordinary glass beads typically have a density of about 2.5 and a refractive index of about 1.5. "High index" beads refers to beads having a density of about 3.5 and a refractive index of about 1.9, whereas "super high index" typically refers to beads having a density of about 5 and a refractive index of about 2.3 or higher. The diameter of the glass beads typically ranges from a few microns to approximately 2500 microns and is preferably from about 25 to 1000 microns.

In addition to having the desired particle size and refractive index, the glass beads are typically transparent. The term transparent means that when viewed under an optical microscope (e.g., at 100×) the microspheres have the property of transmitting rays of visible light so that bodies beneath the microspheres, such as bodies of the same nature as the microspheres can be clearly seen through the microspheres, when both are immersed in oil of approximately the same refractive index as the microspheres. The outline, periphery or edges of bodies beneath the microspheres are clearly discernible. Although the oil should have a refractive index approximating that of the microspheres, it should not be so close that the microspheres seem to disappear as would be the case for a perfect match.

The optical elements may comprise microspheres that are ceramic. In general, ceramic microsphere optical elements are comprised of metal oxides that are substantially colorless. Suitable metal oxides include $Al_2O_3$, $SiO_2$, $ThO_2$, $SnO_2$, $TiO_2$, $Y_2O_3$ and $ZrO_2$ with the oxides of zirconium, silicon, and titanium being preferred. The ceramic microspheres can exhibit a range of properties, depending on the kind and amounts of the various metal oxides employed as well as the method of manufacture. Preferred, however, are dense microspheres having substantially no open porosity and having an average hardness greater than sand.

Additional information concerning the desired properties for various end-uses and methods of manufacture of microspheres (e.g. sol-gel process), can be found in U.S. Pat. Nos. 3,493,403; 3,709,706 and 4,564,556. Glass beads suitable for use as optical elements in the invention are also commercially available from Flex-O-Lite Corporation, Fenton, Mo. and Nippon Electric Glass, Osaka, Japan.

The optical elements of the invention are coated with a surface treatment that alters the floatation properties of the optical elements in the liquid binder. "Float" and derivations thereof, described in the context of glass beads, refers to the beads assuming a position wherein slightly more than half of each bead is submerged. The liquid binder preferably contacts the embedded beads only up to 5° to 30° above their equators. The floatability of the glass beads can be affected to some extent by the particle size, particle size distribution, surface chemistry and chemical make-up of the particular glass beads as well as the chemical make-up, density, and viscosity of the binder. In general, however, only about 10% or less of the glass beads tend to float in heptane test liquid in the absence of an effective surface treatment.

The position that the glass beads attain relative to the undisturbed binder due to the surface treatment assists the anchoring of the beads in the ultimate dried or solidified binder coating. The glass beads are preferably embedded to about 40–70%, and more preferably to about 40–60% of their diameters. The beads are adequately exposed providing a sphere-lens having a large optical aperture relative to its size. During the drying or solidification of the binder, there is some shrinkage of the binder film. However, the beads remain bonded with the centers of the floated beads being approximately equidistant from the underlying back surface of the binder layer or the top surface of the base.

In addition to the improvement in floatation of the optical elements, it is also important that the surface treatment does not adversely affect the adhesion of the optical elements with the liquid binder. The adhesion can be evaluated in several ways and will be described herein with respect to a preferred optical element, glass beads. The initial adhesion can be subjectively determined by estimating the depth to which the embedded glass beads have sunk into the binder after curing. The glass beads are preferably embedded to a depth of about 40–70%, and more preferably to about 40–60% of their diameters. Another way of evaluating adhesion is accelerated aging evaluations. A piece of cured glass bead-embedded binder is conditioned in boiling water for 24 hours. After conditioning, the glass beads are preferably embedded to the same extent as prior to conditioning and the individual glass beads are difficult to remove with a dissection probe. Yet another way to evaluate the effect of the binder on adhesion is comparative tensile testing. A uniform mixture of binder and untreated glass beads at a ratio of about 1 to 3 is drawn down into a film having a thickness of about 0.4 mm. A second mixture of binder and surface treated glass beads employing the same ratio of ingredients and film thickness is prepared. After the samples are fully cured, the samples are conditioned for 24 hours in water at ambient temperature. Tensile testing is conducted with a 1" (2.5 cm) wide sample employing a 2" (5 cm) gap at a rate of 0.5 inches (1.3 cm)/minute. The stress at break of the sample comprising the surface treated beads is about the same as or preferably greater than the control sample, comprising untreated beads ($\geq$about 90% of the standard deviation of the average value). Any one of the previously described methods is typically sufficient to determine whether the surface treatment adversely affects the adhesion of the glass beads to the binder. Preferably, however, all three of the evaluations are conducted.

The optical elements are coated with a fluoropolymer surface treatment. As used herein "surface treatment" refers to a composition that causes at least about 80% of the optical elements to float in heptane or an aromatic solvent, such as toluene, as previously described. The surface treatment comprises at least one fluoropolymer comprising a partially or fully fluorinated hydrocarbon backbone and side chains comprising at least one of fluoroalkyl, fluoroether alkyl, fluoroalkoxy and mixtures thereof; and/or at least one fluoropolymer comprising a hydrocarbon backbone and side chains comprising at least one of fluoroether alkyl, fluoroalkoxy and mixtures thereof. Further, the side chains may optionally contain other heteroatoms.

Such fluoropolymer surface treatments preferably comprise a plurality fluoroalkyl, fluoroether alkyl side chains and/or fluoroalkoxy side chains. The fluoroether alkyl side chains and/or fluoroalkoxy side chains typically comprise 1 to 20 carbons atoms, more preferably 1 to 12 carbon atoms and most preferably 1 to 6 carbon atoms. The fluoroalkyl side chains preferably comprises 1 to 6 carbons atoms and more preferably 1 to 4 carbons atoms, particularly in the case of fluoroether-substituted alkyl (meth)acrylates. The presence of such side chains can be detected by means of x-ray photoelectron spectroscopy (XPS) or time of flight secondary ion mass spectrometry.

Preferred fluoropolymer surface treatments are substantially free of perfluoroalkyl side chains and end groups, having more than 4 carbon atoms. "Substantially free" refers to less than about 1 wt-% of the fluoroalkyl segments containing more than 4 carbon atoms. Most preferably, only trace impurities of fluoroalkyl segments containing more than 4 carbon atoms are present.

Accordingly, the fluoropolymer comprises repeat units selected from —($C_nH_{2n}$)—, —($C_nF_{2n}$)—, —(CH(Z))—, —(CF(Z))—, —($CH_2CH(Z)$)— and combinations thereof, wherein n is an integer ranging from 1 to 20 and Z comprises a fluoroalkyl group, fluoroether alkyl, fluoroalkoxy, and mixtures thereof; with the proviso that wherein the backbone comprises —($CH_2CH(Z)$)— and Z comprises fluoroalkyl, the side chain comprises at least one fluoroether group.

The fluorinated alkyl groups of both the backbone segments as well as the side chains are preferably perfluorinated (i.e., all C—H bonds replaced with C—F bonds) with the exception of the fluoropolymers derived from perfluoroalkyl acrylate wherein the side chain is generally only partially fluorinated.

Fluoropolymers are generally prepared from fluorinated hydrocarbon monomers having a polymerizable double bond. Although many fluoropolymers have been prepared, the most common monomers include tetrafluoroethylene (TFE), chlorotrifluoroethylene (CTFE), vinyl fluoride (VF), and vinylidene fluoride (VDF), and selected copolymers of these olefins with ethylene, hexafluoropropylene (HFP) and perfluorovinyl ethers such as perfluoro(methyl vinyl ether) (PMVE), perfluoro(propyl vinyl ether) (PPVE) and higher homologs such as $CF_2$=CF—O—$CF_2CF(CF_3)$—O—$CF_2CF_2CF_3$ ("PPVE-2").

Such monomers can be synthesized by known techniques, such as described in the *Organofluorine Chemistry: Principles and Commercial Applications*, Edited by R. E. Banks, B. E. Smart and J. C. Tatlow, Plenum Press, NY 1994. Further, many of such monomers are commercially available.

In the preparation of the fluoropolymers, such monomers are generally copolymerized with each other or with a non-fluorinated comonomer to produce a fluoropolymer having a glass transition temperature (Tg) of less than about 25° C. Examples of suitable non-fluorinated comonomers include alkyl (meth)acrylates, substituted alkyl (meth) acrylates, (meth)acrylic acid, (meth)acrylamides, styrenes, vinyl halides, and vinyl esters.

The number of repeat units in the fluoropolymer combined with the molecular weight of optional end groups is sufficient to form a compound having a number average molecular weight (Mn) greater than about 5,000 g/mole. Preferably, the fluoropolymer has a Mn ranging from about 10,000 g/mole to about 30,000 g/mole. The Mn is typically less than about 500,000 g/mole, particularly in the case of fluoropolymers derived from fluorovinyl ether monomer(s). It is surprising that polymeric species that are many times larger in molecular weight than the previous preferred perfluorooctyl base compounds can effectively be employed as surface treatments without compromising bead flow properties or adhesion of the optical elements to the binder, particularly since such polymeric materials do not necessarily bear reactive functional groups A preferred fluoropolymer surface treatment is prepared from perfluorovinyl ether monomer (e.g. PMVE, PPVE, PPVE-2) in combination with a comonomer having a polymerizable double bond. Preferred comonomers include TFE as the sole comonomer or in combination with VDF.

In somewhat greater detail, perfluorovinyl ether monomers correspond to the general formula:

wherein n is an integer independently ranging from 1 to 6, the average value m ranges from 1 to 6, and $R_f$ is a perfluoroalkyl groups having 1 to 6 carbon atoms. $R_f$ can be a linear, branched, or cyclic perfluoroalkyl group. Examples of $R_f$ groups include $CF_3$—, $CF_3CF_2$—, $CF_3CF_2CF_2$— and $CF_3CF(CF_3)$—. Both n and m are preferably an integer of 1 to 3. Further, $R_f$ is preferably a perfluoroalkyl group having 1 to 4 carbon atoms.

The Applicants have found that as the concentration (i.e. mole %) of repeat units derived from perfluorovinyl ether monomer in the fluoropolymer increases, the effective concentration to induce 100% float to optical elements decreases. The concentration of perfluorovinyl ether monomer derived repeat units in the fluoropolymer, as determined by nuclear magnetic resonance spectroscopy (NMR), is typically at least about 1 mole % of the fluoropolymer and preferably greater than about 3 mole %.

In general, the preferred molar concentration of repeat units derived from perfluorovinyl ether is related to the chain length of the side chain. Wherein m is 0 and $R_f$ is $CF_3$, as in the case of PMVE, generally a higher concentration of repeat units derived from perfluorovinyl ether are needed in the fluoropolymer to obtain 100% float of the beads. In such instances, the molar concentration of repeat units derived from perfluorovinyl ether is typically at least 30 mole %. At too high of a molar concentration of repeat units derived from perfluorovinyl ether, however, the fluoropolymer tends to become too compliant, which can result in agglomeration of the coated beads. Alternatively, for embodiments wherein n is 2 or greater (e.g. PPVE, PPVE-2), the concentration of repeat units derived from perfluorovinyl ether in the fluoropolymer, can be considerably lower. The Applicants have found that fluoropolymers having about 10 to about 20 mole % of repeat units derived from PPVE-2, for example, can advantageously be used at concentrations as low as 50 ppm.

The concentration of comonomer employed in the manufacture of the perfluorovinyl ether fluoropolymers is dependent on the choice of perfluorovinyl ether, as previously described, as well as the choice of comonomer(s). In general, however, preferred fluoropolymer surface treatments comprise 0 to about 80 mole % of repeat units derived from TFE and 0 to about 90% of repeat units derived from VDF. For instances wherein PMVE is employed as the sole perfluorovinyl ether monomer, the concentration of repeat units derived from TFE is more preferably about 40 to 60 mole %. Such fluoropolymers also tend to comprise small concentrations (e.g. less than 1 mole %) of a crosslinking agent such as bromotrifluoroethylene (BTFE). In the case of terpolymers having repeat units derived from TFE, VDF and PPVE-2, the preferred molar concentration of repeat units derived from TFE generally ranges from about 10 to about 30 mole %. Further, the concentration of repeat units derived from VDF preferably ranges from about 50 to about 80 mole %.

Particularly preferred perfluorovinyl ether fluoropolymers are substantially free of oxygen in the backbone and include the following general structures wherein x, y and z are each independently integers:

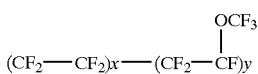

I

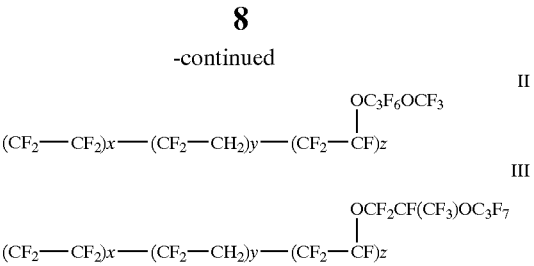

Since perfluorovinyl ether containing fluoropolymers tend to be relatively more expensive than many of the other fluoropolymers, it is advantageous to blend the perfluorovinyl ether fluoropolymer with one or more fluoropolymers that are substantially free of perfluorovinyl ether linkages. In such instances, the fluoropolymer blend preferably comprises the molar concentrations of perfluorovinyl ether linkages, as previously described. Preferred fluoropolymers for blending with the perfluorovinyl ether fluoropolymer include fluoroplastics (i.e. thermoplastic fluoropolymers) and fluoroelastomers such as homopolymers, copolymers and terpolymers comprised of TFE, HFP and VDF.

Another preferred class of fluoropolymer surface treatments for inducing float to the optical elements include homopolymers and copolymers of perfluoroether-substituted alkyl methacrylates and more preferably of perfluoroether-substituted alkyl acrylates. These are prepared by polymerization of monomers with general structure $CH_2$=$C(R)CO_2$-Q-$R_f$ in which R is H or $CH_3$, Q is an organic divalent linking group optionally comprising heteroatoms, unsaturations, and/or functional groups, and $R_f$ is a perfluoroalkyl or perfluoroalkoxy group of 1 to 20 carbons substituted with one and preferably more than one ether oxygens, as described above. Preferred structures for Q are —$(CH_2)_n$— where n=1–11 and preferably 1–2. A particularly preferred structure for Q is —$CH_2$—. Preferred structures for $R_f'$ include —$C_nF_{2n}(OC_mF_{2m})_pOR_f''$ in which n=1–4, m=1–4, p=0–6 and preferably 1–4, and $R_f''$ is a perfluoroalkyl group having 1 to 6 carbon atoms. $R_f''$ can be a linear, branched, or cyclic perfluoroalkyl group. Examples of $R_f'$ groups include $CF_3$—, $C_2F_5$—, and $C_3F_7$. Particularly preferred structures for $R_f'$ include $C_4F_9OC_2F_4OCF_2$—, $CF_3O(C_2F_4O)_2CF_2$—, and $C_3F_7O(CF(CF_3)CF_2O)_nCF(CF_3)$— where n=0–3. The monomers are obtained by reaction of the corresponding alcohols with (meth)acryloyl chloride using standard synthetic techniques. Preferred fluorinated alcohols $R_f'CH_2OH$ for use in synthesis of these monomers are obtained by reduction, again using standard techniques, of derivatives of the corresponding carboxylic acid derivatives $R_f'COX$ (where X=F, OH, or OR where R=methyl or ethyl) using sodium borohydride or lithium aluminum hydride.

Fluorinated poly(meth)acrylates are generally prepared by free radical polymerization either neat or in solvent, using radical initiators well known to those skilled in the art. Other monomers which can be copolymerized with these fluorinated (meth)acrylate monomers include alkyl (meth)acrylates, substituted alkyl (meth)acrylates, (meth)acrylic acid, (meth)acrylamides, styrenes, vinyl halides, and vinyl esters.

Preferred substituted alkyl acrylate comonomers include:

I $R_f^*$—$(CH_2)_mCH_2O_2CCH$=$CH_2$, wherein m=0–25 and preferably 0–10, and $R_f^*$=$C_nF_{2n+1}$ wherein n ranges from 1 to 12 and preferably from 1 to 4;

II $CH_2$=$CHCO_2H$;

III $CH_2$=$CHCO_2(CH_2)_nCO_2H$, wherein n=1–10;

IV $CH_2$=$CHCO_2(CH_2)_nCH_2OH$, wherein n=1–10; and

V $CH_2$=$CHCO_2(CH_2)_nCH_3$, wherein n=1–10.

The fluoropolymer surface treatments described herein may further comprise polar constituents. Such polar groups or polar group containing radicals may be anionic, nonionic, cationic, or amphoteric. In general, the more commonly employed polar groups or polar group-containing organic radicals for aqueous delivery of the treatment solution include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups.

The fluoropolymers described herein for use as surface treatment for optical elements are typically solids. The fluoropolymer(s) are combined with various solvents to form emulsion(s), solution(s) or dispersion(s). Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71–101 and 597–614) as well as assignees' copending patent application Ser. No. 01/03195, filed Jan. 31, 2001.

The emulsion(s), solution(s), and dispersion(s) are then further diluted in order to deliver the desired concentration. It is assumed that negligible amounts of the diluted surface treatment are lost and substantially all of the surface treatment present in the emulsion, solution or dispersion is deposited on the optical elements. Hence, the concentration (ppm) based on the weight of the optical elements being coated with the emulsion, solution, or dispersion is approximately equal to the amount retained on the optical elements upon evaporation of the solvent. Although aqueous emulsions, solutions, and dispersions are preferred, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent. The aqueous surface treatment is coated on the optical elements typically by combining the optical elements with the minimum volume of aqueous surface treatment to uniformly coat the optical elements and then drying the coated elements. Although aqueous delivery is preferred, the surface treatment could also be applied from 100% organic solvent as well as by other techniques such as vapor deposition.

Various fluoropolymer dispersions are commercially available from Dyneon, DuPont, Ausimont, as well as other suppliers.

The surface treatment comprises any one or any mixture thereof of the previously described fluoropolymers, with surface treatments comprising at least one perfluorovinyl ether polymer and or at least one perfluoroether acrylate being preferred.

The amount of fluoropolymer surface treatment employed for coating the optical elements typically ranges from about 5 ppm to about 1000 ppm with respect to the weight of the optical elements. A preferred fluoropolymer surface treatment is one that contributes the desired floatation at minimum concentrations. The amount of fluoropolymer surface treatment is usually about 600 ppm or less, preferably about 300 ppm or less, more preferably about 150 ppm, even more preferably about 100 ppm, and most preferably about 50 ppm or less. Typically, the overall coating thickness of the surface treatment of the present invention is greater than about 15 Angstroms, preferably, greater than about 20 Angstroms, and more preferably, greater than about 50 Angstroms. Thicker coatings can be obtained if desired, although it is preferred that the coating thickness be no greater than about 500 Angstroms, more preferably, no greater than about 300 Angstroms, and most preferably, no greater than about 150 Angstroms thick. Excessive concentrations of surface treatment can result in agglomeration of the optical elements. Such limits can be determined by routine experimentation and in some instances the agglomeration can be reduced by the use of flow control agents.

In addition to the fluoropolymer surface treatment of the invention, the optical elements may comprise one or more additional surface treatments such as adhesion promoters and flow control agents that reduce particle agglomeration. Various silanes such as 3-aminopropyltriethoxysilane are commonly employed as adhesion promoters, whereas methacrylato chromic chloride, commercially available from Zaclon Inc, Cleveland, Ohio under the trade designation "Volan" is a typical flow control agent.

The surface treated optical elements of the invention can be employed for producing a variety of reflective products or articles such as pavement markings, retroreflective sheeting, and beaded projection screens. Such products share the common feature of comprising a liquid binder layer and embedding a multitude of optical elements into the binder surface followed by solidifying the binder to retain the optical elements in place. In the pavement markings, retroreflective sheeting, and beaded projection screens of the invention, at least a portion of the optical elements will comprise the surface treated optical elements of the invention. Typically, the majority of, and preferably substantially all, the optical elements employed in the manufacture of the reflective products will comprise the surface treated optical elements of the invention.

Various known binder materials may be employed including various one and two-part curable binders, as well as thermoplastic binders wherein the binder attains a liquid state via heating until molten. Common binder materials include polyacrylates, methacrylates, polyolefins, polyurethanes, polyepoxide resins, phenolic resins, and polyesters. For reflective paints the binder may comprise reflective pigment. For reflective sheeting, however, the binder is typically transparent. Transparent binders are applied to a reflective base or may be applied to a release-coated support, from which after solidification of the binder, the beaded film is stripped and may subsequently be applied to a reflective base or be given a reflective coating or plating.

There are several types of retroreflective articles in which the surface treated optical elements may be used such as exposed lens (e.g. U.S. Pat. Nos. 2,326,634 and 2,354,018), embedded lens (e.g. U.S. Pat. No. 2,407,680), and encapsulated lens (e.g. U.S. Pat. No. 4,025,159) retroreflective sheeting. Retroreflective articles can be prepared by known methods including a method comprising the steps of: (i) forming a top coat on a release coated web (e.g. coating a solution of hydroxy-functional acrylic polyol and aliphatic polyfunctional isocyanate onto a release-coated paper web and then curing by conveying the coating through an oven at about 150° C. for about 10 minutes); (ii) coating the exposed surface of the top coat with a liquid binder (e.g. coating a solution comprising an oil-free synthetic polyester resin and a butylated melamine resin); (iii) drying the binder to form an uncured tacky bead-bond layer; (iv) cascade-coating onto the bead-bond layer a plurality of glass microspheres forming a monolayer of embedded glass microspheres; (v) curing the bead-containing bead-bond layer to a non-tacky state (e.g. by heating to 150° C.); forming a space coat layer over the bead-containing bead-bond layer (e.g. coating a 25% solids solution comprised of a polyvinylbutyral resin and a butylated melamine resin in a solvent and curing at 170° C. for about 10 minutes); (vi) applying a reflective layer over the space coat layer (e.g. vapor deposition of aluminum metal at a thickness of about 100 nm); and stripping away the release-coated web. An adhesive layer is typically applied to the reflective layer (e.g. by coating a 0.025 mm thick layer of an aggressive acrylic pressure-sensitive adhesive onto a silicone-treated release liner and pressing the adhesive against the reflective layer).

The surface treated optical elements are also useful in pavement marking materials. The optical elements can be incorporated into coating compositions that generally comprise a film-forming material having a multiplicity of optical elements dispersed therein. The surface treated optical elements may also be used in drop-on applications for such purposes as highway lane striping in which the optical elements are simply dropped onto wet paint or hot thermoplastic and adhered thereto.

One typical pavement marking sheet is described in U.S. Pat. No. 4,248,932. This sheet material is a prefabricated strip adapted to be laid on and secured to pavement for such purposes as lane dividing lines and comprises a base sheet, such as a soft aluminum foil which is conformable to a roadway surface; a top layer (also called the support film or binder film) adhered to one surface of the base sheet and being very flexible and resistant to rupture; and a monolayer of surface treated optical elements such as transparent microsphere lens elements partially embedded in the top layer in a scattered or randomly separated manner. The pavement marking sheet construction may also include an adhesive (e.g., pressure sensitive, heat or solvent activated, or contact adhesive) on the bottom of the base sheet. The base sheet may be made of an elastomer such as acrylonitrile-butadiene polymer, polyurethane, or neoprene rubber. The top layer in which the surface treated microspheres are embedded is typically a polymer such as vinyl polymers, polyurethanes, epoxies, and polyesters. Alternatively, the surface treated microsphere lenses may be completely embedded in a layer of the pavement marking sheet.

Pavement marking sheets may be made by processes known in the art (see e.g. U.S. Pat. No. 4,248,932), one example comprising the steps of: (i) coating onto a base sheet of soft aluminum (50 micrometers thick) a mixture of resins (e.g., epoxy and acrylonitrile butadiene elastomer mixture), pigment (TiO$_2$) and solvent (e.g., methyl ethyl ketone) to form the support film; (ii) dropping onto the wet surface of the support film ingredients a multiplicity of the surface treated optical elements of the invention; and curing the support film at 150° C. for about 10 minutes. A layer of adhesive is then usually coated on the bottom of the base sheet.

Pigments or other coloring agents may be included in the top layer in an amount sufficient to color the sheet material for use as a traffic control marking. Titanium dioxide will typically be used for obtaining a white color; whereas, lead chromate will typically be used to provide a yellow color.

A rear projection screen is a sheet-like optical device having a relatively thin viewing layer that is placed at an image surface of an optical projection apparatus. Rear projection screen displays comprising glass microspheres embedded in an opaque matrix are known from U.S. Pat. No. 2,378,252, for example. Generally, the size of the microspheres is less than about 150 microns. For maximum brightness, the microspheres have an index of refraction of less than about 1.8 and preferably from about 1.45 to about 1.75. A plurality of the surface treated glass microspheres are attached to and are in intimate contact with a major surface of a transparent substrate. Alternatively, a diffusion layer can be formed by coating an optically inhomogeneous material as a separate layer onto the transparent substrate prior to application of the opaque binder and microspheres. Rear projection screens are prepared by i) providing a substrate (e.g. polyester, polycarbonate) having an opaque binder disposed thereon (e.g. acrylate loaded with carbon black to make it opaque); and ii) applying the surface treated glass microspheres under conditions effective to produce microspheres in optical contact with the substrate and embedded in the opaque matrix.

In some useful embodiments of the invention, a specular reflective means is provided by a layer of metal (e.g. aluminum) vapor-deposited on the surface treated microspheres. Another useful specular reflective means is a dielectric reflector which comprises one or more layers of a transparent material behind the microspheres, each layer having a refractive index of about 0.3 higher or lower than that of the adjacent layer or beads and each layer having an optical thickness corresponding to an odd numbered multiple of about ¼ wavelength of light in the visible range. More detail on such dielectric reflectors is found in U.S. Pat. No. 3,700,305.

Objects and advantages of the invention are further illustrated by the following examples, but the particular materials and amounts thereof recited in the examples, as well as other conditions and details, should not be construed to unduly limit the invention. All parts, percentages and ratios herein are by weight unless specified otherwise.

Test Methods

1. Heptane Float Test—A single layer of optical elements was spread on a clean inverted pint paint can lid. Heptane was slowly introduced with a syringe or dropper at the edge of the lid until it overflowed. The percentage of optical elements floating was estimated visually. In the absence of indicating otherwise, the beads were tested within 24 hours of being coated with the surface treatment.

2. Depth of Bead Embedment in Binder—A polyurethane liquid binder having the following components was prepared:

| | |
|---|---|
| 27 parts | Rutile titanium dioxide pigment (commercially available from Dupont, New Johnsonville, TN under the trade designation "TIPURE") |
| 25 parts | polyester polyol (commercially available from Union Carbide Corp., Danbury, CT under the trade designation "TONE 0301") |
| 50 parts | aliphatic polyisocyanate (commercially available from Bayer Corp., Pittsburgh, PA under the trade designation "DESMODUR N-100") |

The binder was drawn down on a paper liner at thickness of 0.4 mm. Immediately thereafter, a plurality of the indicated glass beads were cascaded over the binder, maximizing the number of adhered beads per surface area of binder. The bead coated binder was then cured in an oven (100° C. for 30 minutes was typically sufficient for the polyurethane binder). The bead-coated binder film was examined under a microscope. The sample passed when the optical elements were embedded to about 40–70% of their diameters.

3. Accelerated Aging Adhesion—A ¼" (0.6 cm) by 1" (2.5 cm) piece of cured bead-coated binder film, prepared for the Depth of Bead Embedment, was placed in a flask of boiling water for 24 hours. The aged sample was then inspected under a microscope to determine whether the optical elements remained embedded. The sample passed when the sample appeared approximately the same as the initial sample and the beads were difficult to remove with a dissection probe.

4. Coefficient of Retroreflection (RA), in cd/Lux/m$^2$, was measured at an entrance angle of −4.0 degrees and an observation angle of 0.2° according to Procedure B of ASTM Standard E 809-94a. The photometer used for the measurements is described in U.S. Defensive Publication No. T987,003.

Optical Elements

Different types of reflective beads were employed to evaluate the effectiveness of the surface treatment of the invention. Type 1 reflective glass beads had an index of refraction of 2.3 and an average diameter of 71 microns. Type 2 reflective glass beads had an index of refraction of 2.3 and an average diameter of 56 microns. Both the Type 1 and Type 2 beads are representative of optical elements commonly used for reflective sheeting. The Type 1 and Type 2 glass beads had a density of about 4.6 and are composed of barium, titanium and zinc oxides as described in U.S. Pat. No. 3,493,403. Type 3 glass beads had an average diameter of 200 microns, an index of refraction of 1.75 and were prepared according to the teaching of U.S. Pat. No. 4,564,556.

Various fluoropolymers were evaluated to determine their efficacy for inducing float to optical elements. The following abbreviations are employed for the monomer components of the fluoropolymers.

VDF: vinylidene fluoride ($CH_2=CF_2$)
TFE: tetrafluoroethylene ($CF_2=CF_2$)
HFP: hexafluoropropylene ($CF_2=CFCF_3$)
PMVE: perfluoro(methyl vinyl ether) ($CF_2=CF-O-CF_3$)
PPVE: perfluoro(propyl vinyl ether) ($CF_2=CF-O-CF_2CF_2CF_3$)
PPVE-2: $CF_2=CF-O-CF_2CF(CF_3)-O-CF_2CF_2CF_3$
BTFE=bromotrifluoroethylene Table 1, as follows, sets forth the molar concentrations of repeat units derived from the indicated monomer component for Fluoropolymers 1–3.

TABLE 1

| Fluoropolymer | Monomer Component | Mole-% |
|---|---|---|
| 1 | TFE/PMVE/BTFE | 64.3/35.1/0.6 |
| 2 | TFE/VDF/PPVE-2 | 26.1/69.3/4.6 |
| 3 | TFE/VDF/PPVE-2 | 21.5/62.9/15.6 |

Synthesis of Fluoropolymer 1

A polymerization vessel with a total volume of 186.6 L, equipped with an impeller agitator system was charged with 105 L deionized water, 200 g 25% aqueous ammonia and 1780 g of a 30% ammonium perfluorooctanoate (APFO) solution in water. In three subsequent cycles, the vessel was degassed and subsequently charged with nitrogen to assure that all oxygen had been removed. The vessel was heated to 71° C. and the agitation system set to 210 rpm. The vessel was charged with 19 g dichloromethane ($CH_2Cl_2$), 64 g bromotrifluoroethylene (BTFE), 7125 g PMVE and with 1927 g TFE to 16.0 bar absolute reaction pressure. The polymerization was initiated through the addition of 1763 g of a 20% solution of ammonium persulfate (APS) in water. As the reaction started, the reaction temperature of 71° C. as well as the reaction pressure of 16.0 bar absolute was maintained by the feeding TFE, PMVE and BTFE into the gas phase. A feeding ratio of PMVE (kg)/TFE (kg) of 1.044 and BTFE (kg)/TFE (kg) of 0.015 was used. After feeding 24.29 kg TFE (353 min polymerization time), the monomer feed was interrupted and the monomer valves were closed. The reactor was vented and flushed with $N_2$ in three cycles. The 158.3 kg polymer dispersion had a solids content of 31.0%. Latex particles having a diameter of 84 nm, as measured by dynamic light scattering, were obtained.

A small amount of this dispersion was worked up to raw gum by freeze coagulation overnight, and subsequent defrosting and washing with deionized water in three cycles. The raw gum was dried for 15 hours at 130° C. under vacuum. The polymer had a Mooney viscosity, as measured according to ASTM D-1646, of ML 121° C. (1+10) of 68.9 and a melt flow index (MFI), as measured according to ASTM D-1238, at 220° C. with a 5 kg mass of 14.1 g/10 minutes. The polymer was evaluated by means of $^{19}$F-NMR, indicating a chemical composition of 64.3 mole % TFE, 35.1 mole % PMVE and 0.6 mole % BTFE.

Synthesis of Fluoropolymer 2

A polymerization vessel with a total volume of 7.2 l equipped with an impeller agitator system, was charged with 2000 g deionized water and 10 g 30% APFO solution. In three subsequent cycles, the vessel was degassed and subsequently charged with nitrogen to assure that all oxygen had been removed. The vessel was heated to 25° C. and the agitation system set at 320 rpm. A pre-emulsion of PPVE-2 used for the precharge was prepared by emulsifying 100 g PPVE-2 and 10 g 30% APFO solution into 550 ml water with an Ultraturrax agitator at 24,000 rpm for 5 min. The pre-emulsion was further pressurized three times under high shear in a M-110EH Microfluidizer Processor (Microfluidizer Corporation) under 1500 bar pressure. The PPVE-2 pre-emulsion was charged into the reaction vessel. The vessel was further charged with 88.3 g VDF and 61.4 g TFE to a 9.0 bar absolute reaction pressure. A pre-emulsion of PPVE-2 for the continuous feed was prepared by emulsifying 675 g PPVE-2 and 10 g 30% APFO solution into 680 ml water. The polymerization was initiated by adding 417 mL of 0.1% aqueous $KMnO_4$ solution. The amount of $KMnO_4$ solution was continuously fed into the reaction vessel at such rate that the feed was completed within a polymerization time of 291 minutes. As the reaction started, the reaction temperature of 25° C. as well as the reaction pressure of 9.0 bar absolute was maintained by feeding TFE and VDF into the gas phase with a feeding ratio of VDF (g)/TFE (g) of 1.92. The PPVE-2 (continuous feed) pre-emulsion was fed into the liquid phase with a feeding ratio of PPVE-2-pre-emulsion (g)/TFE (g) of 8.75. After feeding 156 g TFE, the monomer feed was interrupted and the monomer valves were closed. Within 10 minutes, the monomer gas phase was reacted down to a vessel pressure of 2.1 bar; then the reactor was vented and flushed with $N_2$ in three cycles. A total of 4427 g of polymer dispersion was obtained having a solids content of 14.3%.

A small amount of this dispersion was worked up to raw gum by freeze coagulation overnight, subsequent defrosting and washing with deionized water in three cycles. The raw gum was dried for 15 hours at 130° C. under vacuum. The polymer had a chemical composition of 23.1 mole % TFE, 69.3 mole % VDF and 4.6 mole % PPVE-2 as obtained by $^1$H/$^{19}$F cross-integration NMR.

Synthesis of Fluoropolymer 3

A polymerization vessel with a total volume of 7.2 l, equipped with an impeller agitator system, was charged with 1500 g deionized water and 10 g 30% APFO solution. In three subsequent cycles, the vessel was degassed and subsequently charged with nitrogen to assure that all oxygen had been removed. The vessel was heated to 60° C. and the agitation system set at 320 rpm. A pre-emulsion of PPVE-2 used for the precharge was prepared by emulsifying 100 g PPVE-2 and 10 g 30% APFO solution into 550 ml water with an Ultraturrax agitator at 24,000 rpm for 5 min. The pre-emulsion was further pressurized three times under high shear in a M-110EH Microfluidizer Processor (Microfluidizer Corporation) under 1500 bar pressure. The PPVE-2 pre-emulsion was charged into the reaction vessel. The vessel was further charged with 54.2 g VDF and 37.4 g TFE to a 6.0 bar absolute reaction pressure. A pre-emulsion of PPVE-2 for the continuous feed was prepared by emulsifying 675 g PPVE-2 and 10 g 30% APFO solution into 680 ml water. The polymerization was initiated by adding 3 g APS dissolved in a few milliliters water. As the reaction started, the reaction temperature of 60° C. as well as the reaction pressure of 6.0 bar absolute was maintained by feeding TFE and VDF into the gas phase with a feeding ratio of VDF (g)/TFE (g) of 1.92. The PPVE-2 (continuous feed) pre-emulsion was fed into the liquid phase with a feeding ratio of PPVE-2-pre-emulsion (g)/TFE (g) of 8.75. After feeding 156 g TFE (24 minute reaction time), the monomer feed was interrupted and the monomer valves were closed. Within 10 min, the monomer gas phase was reacted down to a vessel pressure of 2.1 bar; then the reactor was vented and flushed with $N_2$ in three cycles. 4055 g of polymer dispersion was obtained having a solids content of 24.9%.

A small amount of this dispersion was worked up to raw gum by freeze coagulation overnight, subsequent defrosting and washing with deionized water in three cycles. The raw gum is dried for 15 hours at 130° C. under vacuum. The polymer had a chemical composition of 21.5 mole % TFE, 62.9 mole % VDF and 15.6 mole % PPVE-2 as obtained by $^1H/^{19}F$ cross-integration NMR.

Fluoropolymers 4–7

Fluoropolymers 4–7 are commercially available from Dyneon LLC, Oakdale, Minn. as latex dispersion polymers as set forth in Table II as follows:

TABLE 2

Fluoropolymers 4–7

| Fluoropolymer | Trade Designation | Structure |
| --- | --- | --- |
| 4 | "Dyneon THV Fluorothermoplastic (THV-350C)" | TFE/HFP/VDF |
| 5 | "Dyneon PFA-6900N" | TFE/PPVE |
| 6 | "Dyneon FEPX-6300" | TFE/HFP |
| 7 | "Dyneon THV Fluorothermoplastic (THV-510D)" | TFE/HFP/VDF |

EXAMPLES 1–10

For Examples 1–10, the optical elements were surface treated by charging a 25 g sample of the indicated bead type into a 100 ml beaker. A sufficient amount (8–10 ml) of deionized water was added to cover and wet out the beads. The appropriate amount of fluoropolymer dispersion was then added, as a dilute (usually 1 wt %) solution, in an amount to provide the indicated treatment level, based on the weight of the reflective beads. After stirring, the treated beads were dried in a forced-air oven at 120° C. for 30 to 60 minutes. The resulting beads were free flowing, like the initial untreated beads. The dried beads were evaluated in the Heptane Float Test, as described above. The test results were as follows:

TABLE 3

% Float of Optical Elements Treated with Fluoropolymers 1–4

| Example | Fluoropolymer | Bead Type | Concentration (ppm) | % Float |
| --- | --- | --- | --- | --- |
| Control | none | 2 | 0 | <10% |
| Control | none | 1 | 0 | <10% |
| 1 | 1 | 2 | 150 | 80% |
| 2 | 2 | 2 | 150 | 100% |
| 3 | 3 | 2 | 150 | 100% |
| 4 | 3 | 2 | 100 | 100% |
| 5 | 3 & 4 | 2 | 70 & 150 | 100% |
| 6 | 3 | 1 | 50 | 100% |
| 7 | 4 | 2 | 250 | 40–50% |

EXAMPLES 8–10

Type 1 beads were independently surface treated with 150 ppm of Fluoropolymer 5, 6, and 7. Each sample of beads were treated by adding the beads to a stirred mixture of 12 ml deionized water and 0.25 g of a 3 wt % dispersion of each fluoropolymer in deionized water in a 4 oz (113 ml) jar. Each sample of beads was dried in an oven at 120° C. for 4 hours followed by 100° C. overnight to yield a free-flowing sample. The dried beads were then tested in the Heptane Float Test as described above. In some examples, the dried beads were also tested by replacing the heptane of the Heptane Float Test with toluene. The results were as follows:

TABLE 4

% Float of Optical Elements Treated with Fluoropolymers 8–10

| Example | Treatment | Solvent | % Float |
| --- | --- | --- | --- |
| Control A | None | Heptane | 0 |
| Comp. Ex. 8A | Fluoropolymer 5 | Heptane | 0 |
| Comp. Ex. 9A | Fluoropolymer 6 | Heptane | 0 |
| Comp. Ex. 10A | Fluoropolymer 7 | Heptane | ~20% |
| Control B | None | Toluene | ~30 |
| Example 8B | Fluoropolymer 5 | Toluene | ~100% |
| Example 9B | Fluoropolymer 6 | Toluene | ~100% |
| Example 10B | Fluoropolymer 7 | Toluene | ~100% |

Examples 1–10 illustrate that fluoropolymers having fluorinated backbones with fluoroalkyl or fluoroether alkyl side chains induce float to optical elements. Example 5 in comparison to Example 4 demonstrates that blends containing Fluoropolymer 4 can replace some of the more expensive fluoropolymers comprising PPVE, despite the fact that Fluoropolymer 4 alone gives a lower % float in the bead float test, as depicted in Example 7. Examples 8–10 demonstrate that bead float on toluene can be obtained with Fluoropolymers 5, 6, and 7, despite the relatively poor performance on heptane. Accordingly, Fluoropolymers 5, 6, and 7 are suitable surface treatments for inducing float provided the binder comprises high concentrations of aromatic components such as aromatic solvent.

EXAMPLES 11–14

Table 5, as follows, sets forth the monomer component for each of Fluoropolymers 8–14.

TABLE 5

Structure of Fluoropolymers 8–14

| Fluoropolymer | Monomer Structure |
|---|---|
| 8 | $C_3F_7CH_2O_2CCH=CH_2$ |
| 9 | $CF_3CHFCF_2CH_2O_2CCH=CH_2$ |
| 10 | $C_5F_{11}CH_2O_2CCH=CH_2$ |
| 11 | $C_4F_9OC_2F_4OCF_2CH_2O_2CCH=CH_2$ |
| 12 | $C_4F_9OC_2F_4OCF_2CH_2O_2CCH=CH_2/$ $C_3F_7CH_2O_2CCH=CH_2$ |
| 13 | $C_3F_7[OCF(CF_3)CF_2]_3OCF_2(CF_3)CH_2O_2CCH=CH_2$ |
| 14 | $C_3F_7OCF(CF_3)CF_2OCF(CF_3)CH_2O_2CCH=CH_2$ |

Synthesis of Fluoropolymer 8

$C_3F_7CH_2O_2CCH=CH_2$ can be obtained commercially from Lancaster Synthesis Incorporated, Windham, N.H. A total of 5.23 g of distilled $C_3F_7CH_2O_2CCH=CH_2$ and 0.00464 g of lauroyl peroxide were placed in a 40 ml Pyrex ampoule. The ampoule was conditioned with six freeze, vacuum and thaw cycles such that the ampoule was free of oxygen, and the ampoule was sealed under vacuum. The ampoule was placed in a steel-tube explosion jacket and warmed to 54° C. with intermittent shaking until the lauroyl peroxide, having a melt point of 54° C., had dissolved as determined by periodic removal and inspection. The ampoule in the jacket was heated from 54° C. to 62° C. overnight. The reaction mixture was no longer fluid. After cooling to room temperature by removal from the steam bath, the ampoule was cracked open and the rubbery gel contents were removed carefully in one piece. The initiator by-products and oligomers were extracted by 41.2 g of $C_6H_5CF_3$ at 70° C. overnight. The obtained clear rubbery-gel material was dried to a constant weight of 4.40 g.

Synthesis of Fluoropolymers 9–11

Fluoropolymers 9–11 were prepared in a similar manner as Fluoropolymer 8 using the starting materials and concentrations set forth in the Table 6 as follows.

TABLE 6

Starting Materials for Fluoropolymers 9–11

| Fluoro-polymer | Starting Material | Acrylate (g) | Lauroyl Peroxide (g) |
|---|---|---|---|
| 9 | $CF_3CHFCF_2CH_2OH$ | 10.0 | 0.0104 |
| 10 | $C_5F_{11}CH_2OH$ | 5.01 | 0.00494 |
| 11 | $C_4F_9OCF_2CF_2OCF_2CF_2CH_2OH$ | 18.40 | 0.0269 |

The acrylated starting material for Fluoropolymer 9 is commercially available from Lancaster Synthesis Incorporated, Windham, N.H. With regard to Fluoropolymer 10, the corresponding acid precursor is commercially available from Matrix Scientific, Columbia, S.C. The acid can then be reacted with methanol to form the methyl ester. The corresponding alcohol can be prepared from the reduction of the ester by $NaBH_4$ in ethanol solution. The alcohol can then be acrylated by reaction with acryloyl chloride and triethylamine and the product isolated by vacuum distillation. The starting material for Fluoropolymer 11 can be prepared as described in Example 3 of U.S. Pat. No. 5,437,812. The alcohol can then be acrylated as previously described.

Synthesis of Fluoropolymer 12

$C_3F_7CH_2O_2CCH=CH_2$, was obtained from Lancaster Synthesis Incorporated, Windham, N.H. and distilled to remove inhibitor. A bulk copolymerization of $C_4F_9OCF_2CF_2OCF_2CH_2O_2CCH=CH_2$, obtained as previously described, (15.12 g, 0.0311 mol) and $C_3F_7CH_2O_2CCH=CH_2$ (15.12 g, 0.0595 mol) in a 40 mL ampoule was carried out using lauroyl peroxide initiator (0.18 g, 0.00045 mol) which can generate 0.00090 mol of free radicals. Used ideally this would produce 100-unit chain lengths (200-unit if chains terminated by radical recombination) each having about 37000 (75000) molecular weight. In practice the chains are much longer, as they are generated just by the initial phase of initiator decomposition, the remainder decomposing later after all the monomer has been consumed. The polymerization was conducted in the same manner as described for Fluoropolymer 8. The ampoule was cracked open and the rubbery gel contents were removed carefully in one piece, 28.74 g, leaving 1.58 g of semiliquid material behind. The obtained rubbery-gel material was dissolved in methyl perfluorobutyrate at 100° C. for 7.5 hours.

Synthesis of Fluoropolymer 13

From $C_3F_7[OCF(CF_3)CF_2]_3OCF(CF_3)CO_2CH_3$, commercially available from Lancaster Synthesis Incorporated, the corresponding alcohol was prepared by the reduction of the ester by $NaBH_4$ in THF solution. The acrylate was prepared and distilled, and the polymerization conducted in the same manner as described for Fluoropolymer 8.

Synthesis of Fluoropolymer 14

Fluoropolymer 14 was prepared in the same manner as Fluoropolymer 13 with the exception that $C_3F_7OCF(CF_3)CF_2OCF(CF_3)CO2CH_3$, commercially available from Lancaster Synthesis Incorporated, was employed as the starting material.

Fluoropolymers 8–14 were evaluated to determine the efficacy of such derivatives to induce float to glass beads. Fluoropolymers 8 and 9 were dissolved in "HFE 7100" (methyl perfluorobutyl ether), available from 3M, whereas Fluoropolymers 10–14 were dissolved in "FLUORINERT FC-75", available from 3M, to obtain the desired concentration. The fluoropolymer employed, theoretical concentration of fluoropolymer on Type 1 bead, and % Float are reported in Table 7 as follows:

TABLE 7

% Float of Fluoropolymers 8–14

| Example | Fluoropolymer | Concentration (ppm) | % Float |
|---|---|---|---|
| Comp. Ex. 11 | 8 | 250 | 90 |
| Comp. Ex. 12 | 9 | 250 | 60 |
| Comp. Ex. 13 | 10 | 250 | 100 |
| 14 | 11 | 250 | 100 |
| 15 | 12 | 250 | 100 |
| 16 | 13 | 250 | 100 |
| 17 | 14 | 250 | 100 |

(Comp. Ex.-comparative example)

Table 7 depicts surface treatments comprising fluoropolymers having a hydrocarbon backbone and fluoroether alkyl side chains. Examples 14–17 exhibit improved float properties in comparison to Comparative Examples 11 and 12. Further, Fluoropolymers 11–14 (Examples 14–17) exhibit comparative float properties with regard to Fluoropolymer 10 (Example 13), a fluoropolymer comprising a perfluoroalkyl group having more than 4 carbon atoms.

EXAMPLES 18

Adhesion testing was conducted on some of the surface treated glass beads. Type 3 glass beads were pretreated with 600 ppm of 3-aminopropyltriethoxysilane commercially available from OSI Specialties, Danbury, Conn. under the trade designation "Silquest A-1100". The surface treatment was prepared as previously described. The solutions were further diluted with water to obtain the desired treatment level. Type 3 beads were coated with the surface treatment indicated in column 1 at the treatment level indicated in column 2 in the manner previously described. Table 8 depicts the % Float, Bead Sink, Accelerated Aging Adhesion, and the Coefficient of Retroreflection (RA).

TABLE 8

| Surface Treatment | Concentration (ppm) | Float (%) | Depth of Bead Embedment in Binder (%) | Accelerated Aging Adhesion (pass/fail) | RA (cd/lux/m$^2$) |
|---|---|---|---|---|---|
| Control* (none) | 0 | 0 | ~95 | ** | 0.60 |
| Control (none) | 0 | 0 | ~95 | ** | .092 |
| Fluoropolymer 3 | 100 | ~95 | ~50 | Pass | 6.6 |

*no "Silquest A-1100"
**Could not be determined since the beads were embedded to 95%.

What is claimed is:

1. Optical elements having a surface treatment comprising at least one fluoropolymer selected from:
   a) fluoropolymers comprising a fluorinated hydrocarbon backbone and side chains comprising at least one of fluoroalkyl, fluoroether alkyl, fluoroalkoxy and mixtures thereof; and
   b) fluoropolymers comprising a hydrocarbon backbone and side chains comprising at least one of fluoroether alkyl, fluoroalkoxy and mixtures thereof;
   wherein the fluoropolymer is present at an amount of less than about 300 ppm and the optical elements exhibit a percent float in heptane of at least about 90%.

2. The optical elements of claim 1 wherein the fluoropolymer is perfluorinated.

3. The optical elements of claim 1 wherein said surface treatment is substantially free of perfluoroalkyl side chains or end groups, having more than 6 carbon atoms.

4. The optical elements of claim 1 wherein said surface treatment is substantially free of perfluoroalkyl side chains or end groups, having more than 4 carbon atoms.

5. The optical elements of claim 1 wherein the fluoropolymer is prepared from at least one perfluorovinyl ether monomer and at least one comonomer having a polymerizable double bond.

6. The optical elements of claim 5 wherein the backbone of the fluoropolymer is free of oxygen atoms.

7. The optical elements of claim 5 wherein the perfluorovinyl ether monomer is selected from CF$_2$=CF—O—CF$_3$, CF$_2$=CF—O—CF$_2$CF$_2$CF$_3$, CF$_2$=CF—O—CF$_2$CF(CF$_3$)—O—CF$_2$CF$_2$CF$_3$ and mixtures thereof.

8. The optical elements of claim 7 wherein the perfluorovinyl ether monomer is CF$_2$=CF—O—CF$_3$ and the fluoropolymer comprises at least about 30 mole % of repeat units derived from CF$_2$=CF—O—CF$_3$.

9. The optical elements of claim 7 wherein the perfluorovinyl ether monomer is CF$_2$=CF—O—CF$_2$CF$_2$CF$_3$ and the fluoropolymer comprises about 10 to about 20 mole % of repeat units derived CF$_2$=CF—O—CF$_2$CF$_2$CF$_3$.

10. The optical elements of claim 7 wherein the perfluorovinyl ether monomer is CF$_2$=CF—O—CF$_2$CF(CF$_3$)—O—CF$_2$CF$_2$CF$_3$ and the fluoropolymer comprises about 1 to about 10 mole % of repeat units derived from CF$_2$=CF—O—CF$_2$CF(CF$_3$)—O—CF$_2$CF$_2$CF$_3$.

11. The optical elements of claim 6 wherein the comonomer is tetrafluoroethylene.

12. The optical elements of claim 11 wherein the fluoropolymer comprises from about 10 to about 30 mole % of repeat units derived from tetrafluoroethylene.

13. The optical elements of claim 11 further comprising vinylidene fluoride comonomer.

14. The optical elements of claim 13 wherein the fluoropolymer comprises from about 50 to about 80 mole % of repeat units derived from vinylidene fluoride.

15. The optical elements of claim 6, wherein the comonomer is selected from the group consisting of alkyl (meth) acrylates, (meth)acrylic acid, (meth)acrylamides, styrenes, vinyl halides, vinyl esters, and mixtures thereof.

16. The optical elements of claim 1, wherein die fluoropolymer is a homopolymer or copolymer prepared from at least one monomer selected from the group consisting of fluoroalkyl ether acrylate, fluoroalkoxy acrylate, and mixtures thereof.

17. The optical elements of claim 16 wherein the copolymer further comprises repeat units derived from at least one monomer selected from the group consisting of alkyl (meth) acrylates, (meth)acrylic acid, (meth)acrylamides, styrenes, vinyl halides, vinyl esters, and mixtures thereof.

18. The optical elements of claim 1 wherein the fluoropolymer is present at an amount of about 50 ppm or less.

19. The optical elements of claim 1, wherein the surface treatment further comprises a second polymer blended therewith.

20. A method of coating optical elements comprising the steps of:
   a) providing at least one surface treatment selected from:
      i) fluoropolymers comprising a fluorinated hydrocarbon backbone and side chains comprising at least one of fluoroalkyl, fluoroether alkyl, fluoroalkoxy and mixtures thereof; and
      ii) fluoropolymers comprising a hydrocarbon backbone and side chains comprising at least one of fluoroether alkyl, fluoroalkoxy and mixtures thereof
   b) coating optical elements with said composition; and
   c) drying said composition.

21. The method of claim 20 wherein said surface treatment is an aqueous composition.

22. The method of claim 21 wherein said aqueous composition comprises up to about 30 wt-% of a cosolvent with respect to the total weight of the surface treatment solution.

23. A pavement marking comprising a liquid binder and a multitude of the optical elements of claim 1.

24. The pavement marking of claim 23 the optical elements are embedded in the binder at a depth of about 40–70% of their diameters.

25. A reflective sheeting comprising:
   a) a top coat layer having an exposed surface;
   b) a binder layer disposed on the exposed surface of the top coat layer;
   c) a multitude of the optical elements of claim 1 disposed iii the binder layer,
   d) a space coat layer disposed on the binder layer and
   (e) a reflective layer disposed on the space coat layer.

26. The reflective sheeting of claim 25 wherein the optical elements are embedded in the binder at a depth of about 40–70% of their diameters.

27. A rear projection screen comprising a transparent substrate and the optical elements of claim 1 embedded in an opaque binder matrix and wherein said optical elements are in contact with the transparent substrate.

28. The rear projection screen of claim 27 wherein the optical elements are embedded in the binder at a depth of about 40–70% of their diameters.

* * * * *

UNITED STATES PATENT AND TRADEMARK OFFICE
CERTIFICATE OF CORRECTION

PATENT NO.   : 6,734,227 B2
DATED        : May 11, 2004
INVENTOR(S)  : Jing, Naiyong It is certified that error appears in the above-identified patent and that said Letters Patent is hereby corrected as shown below:

Column 6,
Lines 58-63, after "groups" delete "A preferred fluoropolymer surface treatment is prepared from perfluorovinyl ether monomer (e.g. PMVE, PPVE, PPVE-2) in combination with a comonomer having a polymerizable double bond. Preferred comonomers include TFE as the sole comonomer or in combination with VDF." and insert the same on line 59 as a new Paragraph.

Column 8,
Lines 28 and 30, delete "$R_f$" and insert -- $R_{f'}$ --, therefor.
Line 40, delete "$R_f'$" and insert -- $R_{f'}$ --, therefor.

Column 19,
Line 35, after "groups" delete ",".
Line 55, after "derived" insert -- from --.

Column 20,
Line 8, delete "die" and insert -- the --, therefor.
Line 33, delete "thereof" insert -- ; --.
Line 43, after "claim 23" insert -- wherein --.
Line 52, delete "iii" and insert -- in --, therefor.
Line 52, after "layer" delete "," and insert -- ; --, therefor.
Line 53, after "layer" (second occurrence) insert -- ; --.

Signed and Sealed this

Ninth Day of November, 2004

JON W. DUDAS
*Director of the United States Patent and Trademark Office*